UNITED STATES PATENT OFFICE.

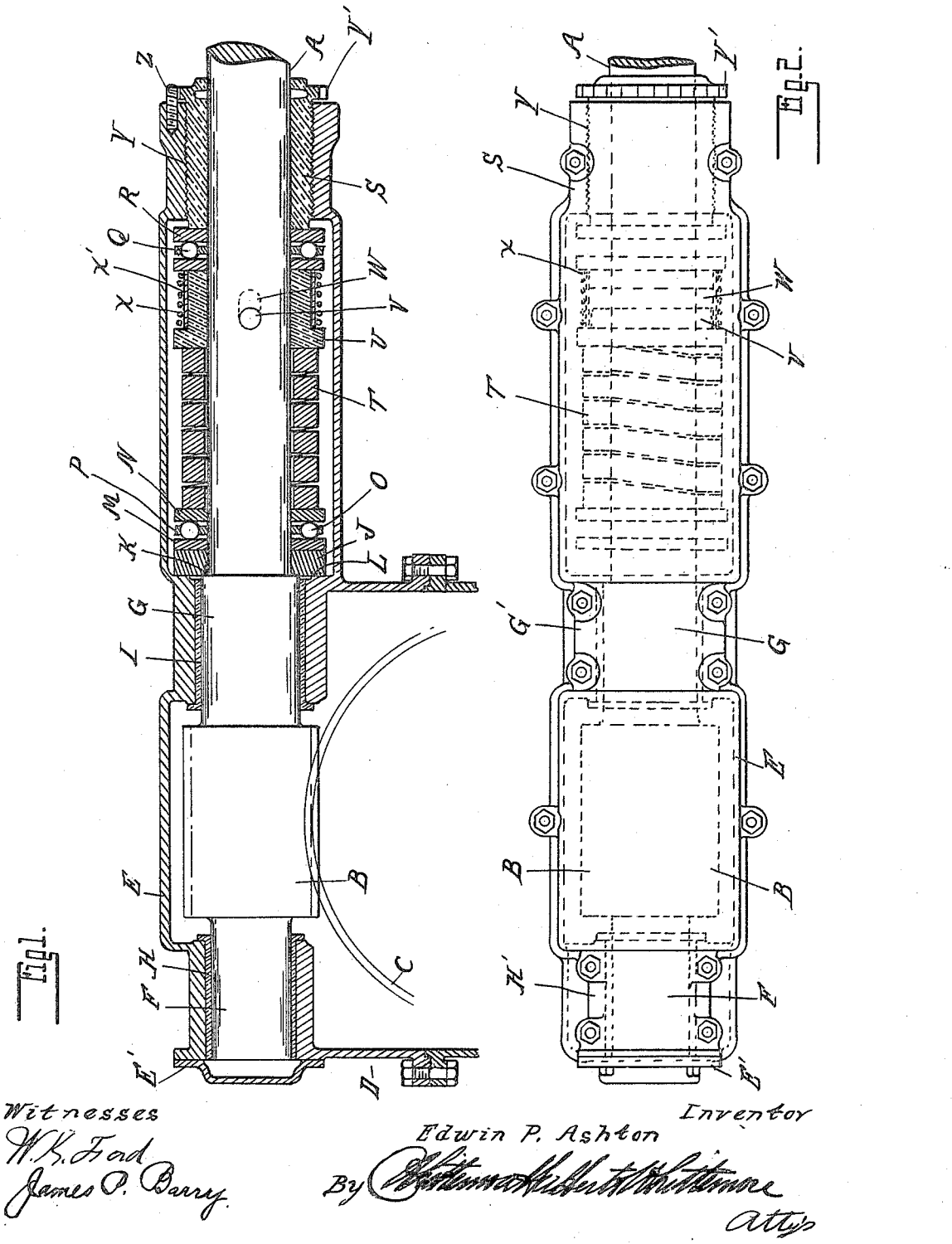

EDWIN P. ASHTON, OF DETROIT, MICHIGAN.

YIELDABLE THRUST-BEARING FOR WORM-SHAFTS.

1,152,689.

Specification of Letters Patent.

Patented Sept. 7, 1915.

Application filed August 3, 1912. Serial No. 713,061.

*To all whom it may concern:*

Be it known that I, EDWIN P. ASHTON, a citizen of the United States of America, residing at Detroit, in the county of Wayne and State of Michigan, have invented certain new and useful Improvements in Yieldable Thrust-Bearings for Worm-Shafts, of which the following is a specification, reference being had therein to the accompanying drawings.

The invention relates to power transmission mechanism, including a rotative shaft which is subjected to end thrust, and more particularly worm gearing.

It is the object of the invention to provide a simple and thoroughly mechanical construction in which end thrust in one or in opposite directions is yieldably resisted; and further to accomplish this with a single spring or resilient member.

In the drawings: Figure 1 is a longitudinal section in the plane of the worm shaft showing the latter in elevation; and Fig. 2 is a plan view of Fig. 1.

A is a rotary shaft upon which is mounted the worm B engaging the worm-wheel C, having a transverse axis.

D is a housing inclosing the worm gearing and shaft and including a detachable cap E, separable from the casing in the plane of the shaft.

To take care of the radial thrust the shaft A is provided with journaled portions F and G upon opposite ends of the worm B, and which engage corresponding journal bearings H and I formed in the casing D and cap E. These bearings do not provide for end thrust and sufficient clearance is left between the bearing and the worm B to permit a limited endwise movement of the shaft in either direction.

Adjacent to one end of the bearing such as I is arranged a yieldable thrust bearing of the following construction:

J is a ring on the shaft engaging a shoulder K thereon in the normal position of parts, and also bearing against a shoulder L on the case, preferably at the end of the bearing I. This ring J forms an abutment for the hardened ball-race M of a ball thrust bearing including a coöperating race N, a series of balls O and a retainer P.

Q is a second ball or roller thrust bearing having similar parts abutting against a shoulder R, upon a journaled bearing S upon the shaft. Between the roller thrust bearings is a coil spring T sleeved upon the shaft, one end thereof abutting against the race N, while the opposite end bears against a collar U adjacent to the bearing Q. This collar has a limited slidable movement upon the shaft to which it is coupled by a cross pin V engaging longitudinal slots W, the arrangement being such that the shaft A has a limited sliding movement in the collar U in the direction of the arrow, while movement in the opposite direction will be communicated to the collar U through the pin V.

In use the shaft A may be freely revolved in the journal bearings H, I and S to rotate the worm B and communicate movement to the worm wheel C in either direction. The end thrust in the shaft resulting from this movement, if in the direction of the arrow will be yieldably resisted through the medium of the shoulder K, collar J, roller thrust bearings M, N and O, spring T, collar U, roller thrust bearing Q and shoulder R. Thus any movement will necessitate the compression of the spring T, which is of sufficient tension to hold the parts in normal position but which will yield under any abnormal stress, avoiding stripping of the gears. Where the direction of thrust is opposite to that indicated by the arrow, the pin V will transmit thrust to the collar U and from the latter through the spring T to the roller thrust bearings M, N and O, and shoulder L so that the same spring T yieldably resists thrust in opposite direction. To prevent disengagement of the roller bearing Q when the collar U is withdrawn therefrom, a coil spring X of comparatively slight tension is sleeved upon said collar, bearing against a shoulder at one end and at its opposite end against the roller bearing Q. This spring is under sufficient tension to take up the motion of the shaft and collar, holding the bearing Q from movement. A tubular casing X' between the spring X and collar U serves to hold the pin V from disengagement.

For taking up any wear which would result in lost motion in the transmission, the bearing S preferably has a threaded engagement Y with the casing and is provided with a notched head Y', which is held in different positions of adjustment by a screw or pin Z. This permits of adjusting the bearing S longitudinally by disengagement of the pins Z and slightly rotating the notched head Y', after which the pin or screw Z may be re-inserted to lock the parts from movement.

The bearings H, I and S are preferably provided with detachable caps H', G' and S', which may be secured before the engagement of the cap E. This permits the assembling of all of the parts of the thrust bearing upon the shaft A, inserting said shaft in the journal bearings, and securing the caps, after which the space in which the thrust bearing is located may be filled with dope and the cap E then secured in position. The cap E in addition to covering the thrust bearing also houses the worm and the journal bearings with their independent caps.

This construction is advantageous, and particularly upon motor trucks and other heavy vehicles where it is desirable to carry an extra shaft for quick insertion in case of breakage. By my construction if a break occurs in the shaft or any part of the mechanism in connection therewith, the caps may be removed, the shaft taken out, and an extra shaft inserted in a very short time.

A further advantage of the construction is that the cap E may be removed to expose all of the mechanism intact when the latter is being tested, as well as during adjustment of the thrust bearing to take up any lost motion. When the cap E is in place it forms a dust-proof housing in connection with an end cap E' which covers the end of the shaft.

What I claim as my invention is:

1. The combination with a rotative shaft of a collar having a cross pin engagement with said shaft, an anti-friction roller bearing for receiving thrust from said shaft through the medium of said collar, an anti-friction roller bearing for receiving thrust in the opposite direction, a resilient member sleeved upon said shaft intermediate said collar and the last-mentioned anti-friction roller bearing, and a resilient member of lesser tension between said collar and the first-mentioned roller bearing.

2. The combination with a rotative shaft of a collar having a cross pin engagement with said shaft, an anti-friction roller bearing for receiving thrust from said shaft through the medium of said collar, an anti-friction roller bearing for receiving thrust in the opposite direction, a resilient member sleeved upon said shaft intermediate said collar and the last-mentioned anti-friction roller bearing, said cross-pin extending transversely through said shaft and collar and engaging a slotted bearing in the latter, permitting relative movement of the collar and shaft, a tubular casing sleeved about said collar for retaining said pin from disengagement, and a resilient member of slight tension sleeved upon said tubular casing and bearing upon said collar and first-mentioned roller bearing.

3. The combination with a rotative shaft, of a journal bearing therefor, a member arranged on the shaft and disposed to rotate therewith, said member being supported for limited movement longitudinally of the shaft, a stop carried by the shaft, a spring embracing the shaft and contacting with said member, a thrust bearing interposed between said spring and said stop, a member constituting a stop embracing the shaft, a thrust bearing interposed between said stop member and the first mentioned member, and means for adjusting the stop member.

4. The combination with a rotative shaft, of a journal bearing therefor, a member arranged on the shaft and disposed to rotate therewith, said member being supported for limited movement longitudinally of the shaft, a ring carried by the shaft, a spring embracing the shaft and contacting with said member, a thrust bearing interposed between said spring and said ring, a member constituting a stop embracing the shaft on the opposite side of the member, a spring embracing the member on the shaft, and a thrust bearing interposed between said stop member and the first mentioned member and spring.

5. The combination with a rotative shaft, of a journal bearing therefor, a collar on said shaft having a loose connection therewith for limited movement in one direction while permitting adjustment in the opposite direction, a thrust bearing and a resilient member interposed between said collar and said thrust bearing revoluble with the shaft.

6. The combination with a rotative shaft, of bearings in which said shaft is journaled, a resilient member sleeved on said shaft intermediate said bearings, anti-friction bearings near the opposite ends of said resilient member, a collar adjacent one of said anti-friction bearings, said collar having a connection with the shaft permitting longitudinal adjustment of the same, and a ring adjacent the opposite anti-friction bearing having a shouldered engagement with the shaft.

7. The combination with a rotative shaft, of a journal bearing therefor, a collar on said shaft having a loose connection therewith for limited movement in one direction while permitting adjustment in the opposite direction, and a resilient member sleeved upon said shaft intermediate said collar and said journal bearing, said resilient member being revoluble with the shaft.

8. The combination with a rotative shaft, of a journal bearing therefor, a collar arranged on said shaft, said collar being supported for a limited movement longitudinally of the shaft, a resilient member embracing the shaft and interposed between the collar and the bearing, a stop embracing the shaft on the opposite side of the movable collar, an anti-friction bearing adjacent the stop, and a resilient member interposed between the collar and the anti-friction bearing.

9. The combination of a rotative shaft, of a journal bearing therefor, a collar on said shaft having a cross pin engagement therewith, a thrust bearing, and a resilient member interposed between said collar and said thrust bearing revoluble with the shaft.

10. The combination with a rotative shaft, of a journal bearing therefor, a collar on said shaft having a cross pin engagement therewith for limiting movement in one direction while permitting adjustment in the opposite direction, and a resilient member sleeved upon said shaft intermediate its collar and said journal bearing, said resilient member being revoluble with the shaft.

In testimony whereof I affix my signature in presence of two witnesses.

EDWIN P. ASHTON.

Witnesses:
JAMES P. BARRY,
DELBERT COLLINS.